United States Patent [19]
Shimomura

[11] Patent Number: 5,980,171
[45] Date of Patent: Nov. 9, 1999

[54] METHOD AND APPARATUS FOR MILLING CRANKSHAFTS

[75] Inventor: Masumi Shimomura, Ishikawa, Japan

[73] Assignee: Komatsu Machinery Corp., Ishikawa, Japan

[21] Appl. No.: 09/152,796

[22] Filed: Sep. 14, 1998

[30] Foreign Application Priority Data

Sep. 16, 1997 [JP] Japan .................................. 9-250424

[51] Int. Cl.⁶ ..................................................... B23C 1/30
[52] U.S. Cl. ............................. 409/132; 82/106; 409/200
[58] Field of Search ................................... 409/132, 199, 409/200; 82/106; 407/12

[56] References Cited

U.S. PATENT DOCUMENTS

| | | | |
|---|---|---|---|
| 4,090,422 | 5/1978 | Berbalk | 82/9 |
| 4,895,057 | 1/1990 | Berstein et al. | 82/165 |
| 5,725,339 | 3/1998 | Yoshita | 409/132 |
| 5,769,578 | 6/1998 | Shimomura | 409/132 |
| 5,829,930 | 11/1998 | Shimomura | 409/134 |

*Primary Examiner*—Andrea L. Pitts
*Assistant Examiner*—Adesh Bharava
*Attorney, Agent, or Firm*—Wenderoth, Lind & Ponack, L.L.P.

[57] ABSTRACT

A method of machining with a crankshaft miller to machine a workpiece into a crankshaft with pin and journal portions is disclosed in which a crankshaft workpiece is held in a chuck and is machined for at least a part of pin and journal portions of it with a cutting edge of a cutter body attached to a rotating cutter drum. In this method, such a cutter body is prepared having a diameter of its inner peripheral surface that is slightly larger than the diameter of a pin or journal portion of the workpiece to be machined. The cutter body so prepared is attached to the cutter drum via an adapter having an opening which is larger in diameter than both a diameter of the chuck and a maximum swing of the workpiece. Then, the cutter drum is positioned at a standby site in an area where the chuck is located and the workpiece is secured and held in the chuck. Then, after the workpiece is indexed or determined with respect to its phase position, the cutter drum is moved in a longitudinal direction of the workpiece to position the cutter body at a given machining site and is rotated to machine that portion with the cutting edge of the cutter body. These steps are repeated for all machinable pin and journal portions at altered machining sites. A cutter apparatus for performing the method is also disclosed.

13 Claims, 13 Drawing Sheets

METHOD AND APPARATUS FOR MILLING CRANKSHAFTS

TECHNICAL FIELD

The present invention relates to a method of machining a crankshaft workpiece using a crankshaft miller, and also to a workpiece machining cutter apparatus therefor.

BACKGROUND ART

A crankshaft is commonly used in an engine and has pin and journal portions typically shaped into by machining with a crankshaft miller.

FIGS. 1A to 3B show how a pin portion of a crankshaft workpiece is machined and shaped typically, by using a crankshaft miller. A crankshaft workpiece $\underline{b}$ with a pin portion $\underline{c}$ is clamped at its ends in chucks $\underline{a}$ in the crankshaft miller in which the pin portion $\underline{c}$ is machined or milled over its peripheral surface by a cutting edge $\underline{e}$ attached along the inner peripheral surface of a ring-shaped cutter $\underline{d}$ while the cutter is in rotation.

Figure 1A:
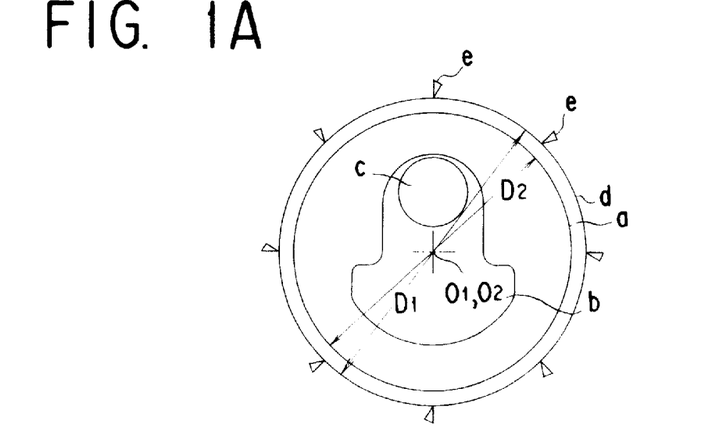
FIGS. 1A to 1C are diagrammatic views of a crankshaft milling or machining operation, showing how a conventional workpiece machining cutter apparatus used in a crankshaft miller is operated to machine a workpiece into a shaped crankshaft.

Specifically in that method, the workpiece $\underline{b}$ carried in between the chucks $\underline{a}$ is first positioned with respect to its phase and clamped at ends thereof by the chucks $\underline{a}$. In this stage, so that it may not disturb the workpiece $\underline{b}$ entering, the cutter $\underline{d}$ is placed on standby at $\underline{a}$ position that is concentric with the chucks $\underline{a}$ on their side as shown in FIG. 1A. The inner diameter D1 of the cutter $\underline{d}$ is larger than the outer diameter D2 of the chucks $\underline{a}$.

Figure 1B:
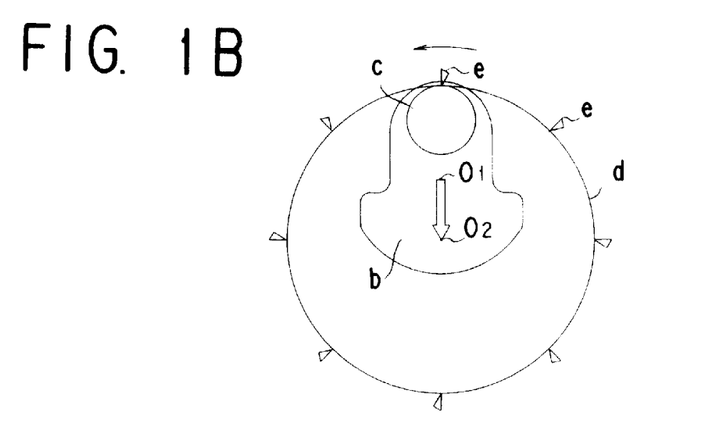
Figure 1C:
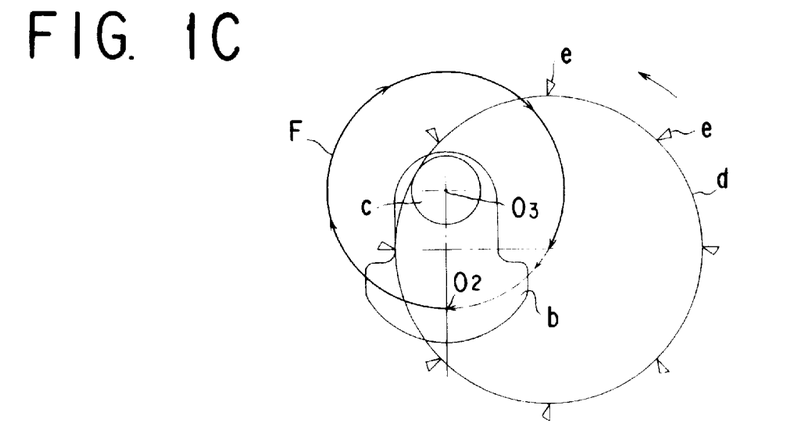

In machining pin portions, starting with a first pin portion $\underline{c}$, while the cutter $\underline{d}$ is rotated in the direction of the arrow shown in FIG. 1B and 1C, the center 02 of the cutter $\underline{d}$ located at the center 01 of the workpiece $\underline{b}$ when positioned with respect to its phase is displaced downwards as shown in FIG. 1B to permit the cutting edge $\underline{e}$ attached along the inner peripheral surface of the cutter $\underline{d}$ to machine the outer peripheral surface of the pin portion c.

Then, the center 02 of the cutter $\underline{d}$ is displaced along a circular path F centering around the center 03 of the pin portion $\underline{c}$ as shown in FIG. 1C to allow the cutting edge $\underline{e}$ attached along the inner peripheral surface of the cutter $\underline{d}$ to mill the outer peripheral surface of the pin portion c.

When machining of the first pin portion $\underline{c}$ is finished, the cutter d is displaced in the longitudinal direction of the workpiece $\underline{b}$ to index and position a pin portion $\underline{c}$ to be machined next, and a repetition of the operations mentioned above follows. With these operations repeated for all pin portions $\underline{c}$ of the workpiece $\underline{b}$, the pin portions $\underline{c}$ are all machined.

In such use of a crankshaft miller employing a conventional inner edged cutter as described, because the cutter $\underline{d}$ is placed on standby where the chucks $\underline{a}$ are placed while the workpiece $\underline{b}$ is carried into and out of a machining area, the inner diameter D1 of the cutter $\underline{d}$ is sized to be larger than the diameter of the chucks $\underline{a}$. Further, if the maximum swing (the largest diameter) of the workpiece $\underline{b}$ is greater than the outer diameter of the chucks $\underline{a}$, to enable a plurality of pin portions $\underline{c}$ arranged in the longitudinal direction of the workpiece $\underline{b}$ to be machined by the cutter $\underline{d}$ on displacement in steps in that direction, the cutter $\underline{d}$ along whose inner peripheral surface the cutting edge $\underline{e}$ is attached is sized to have an inner diameter D1 which is larger than that maximum swing.

If, however, a conventional cutter $\underline{d}$ whose inner diameter D1 is greater than the outer diameter D2 of chucks $\underline{a}$ is used to machine the outer peripheral surface of a pin portion $\underline{c}$ of any diameter, disadvantageously a geometrical error may develop, resulting in the inability to achieve a machined surface of due roundness, as described below.

Figure 2:
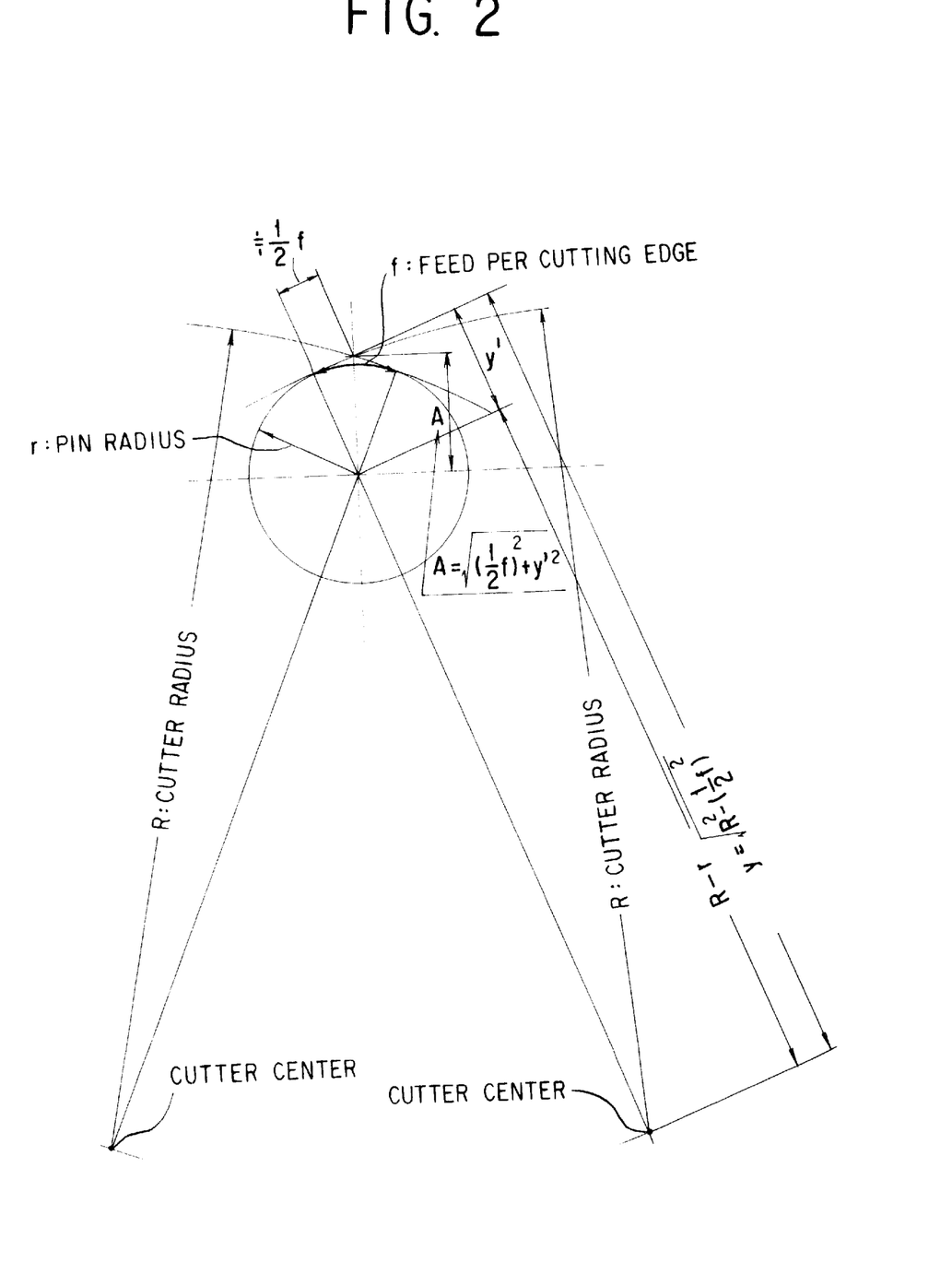
FIG. 2 is a model diagram showing what occurs in a machining operation carried out with the conventional workpiece machining cutter apparatus.

FIG. 2 diagrammatically shows what comes about when a pin portion $\underline{c}$ whose outer periphery has a radius $\underline{r}$ is machined with a cutter $\underline{d}$ whose inner periphery has a radius $\underline{R}$. Assuming that the feed per cutting edge of the cutting edge $\underline{e}$ formed along the inner peripheral surface of the cutter $\underline{d}$ is $\underline{f}$, then in the diagram of FIG. 2

$$y = \overline{R^2 - (f/2)^2},$$

$$y' = y - (R-r), \text{ and}$$

$$A = \overline{(f/2)^2 - y'^2}.$$

Figure 3A:
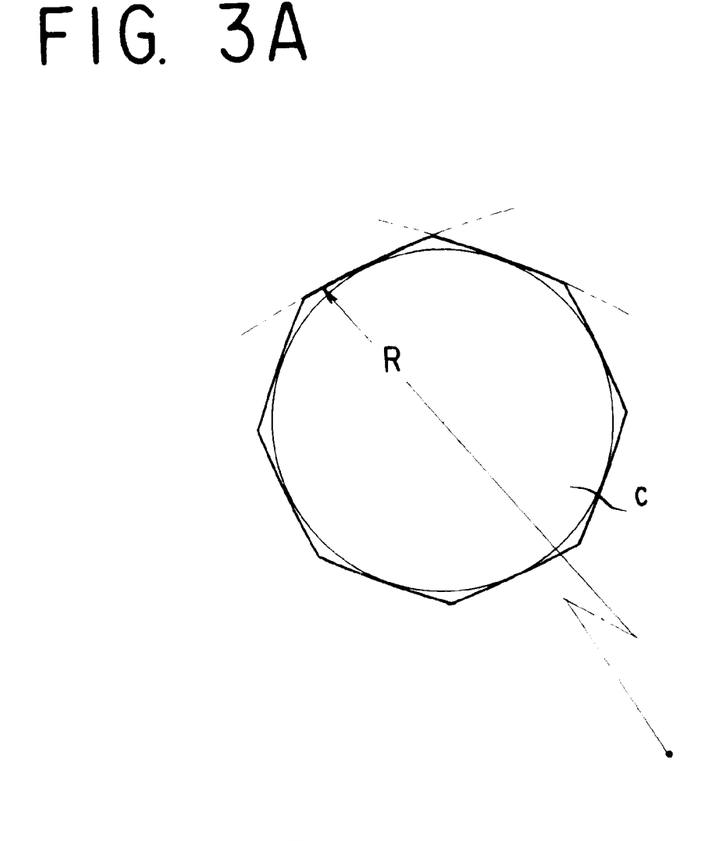
FIG. 3A is a diagrammatic representation showing the surface of a workpiece that is machined using a conventional workpiece machining cutter apparatus.
Figure 3B:
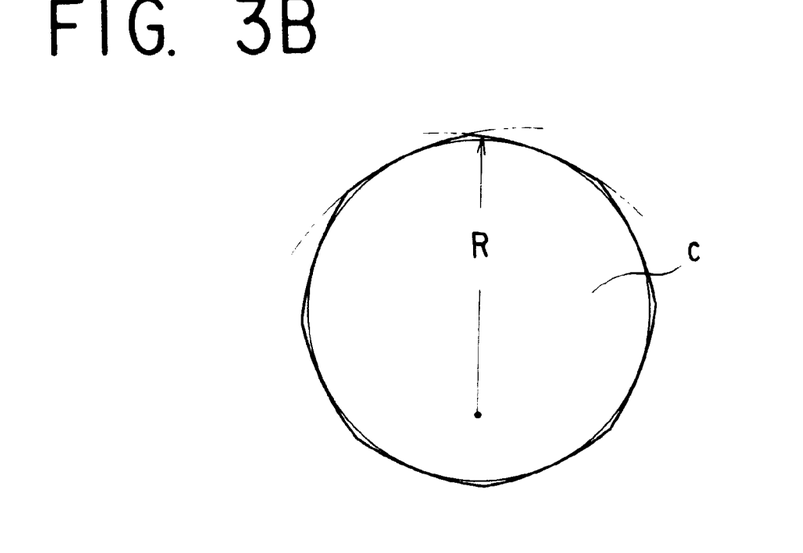
FIG. 3B is a diagrammatic representation of the surface of a workpiece that is machined using a conventional workpiece machining cutter apparatus which is small in inner diameter.

The theoretical roundness δ of a machined surface of the pin portion $\underline{c}$ being represented by δ=r−A, it can also be seen that a surface of the pin portion $\underline{c}$ when machined with a cutter $\underline{d}$ which is larger in inner diameter becomes more polygonal as shown in FIG. 3A and has roundness reduced relative to when machined with a cutter which is smaller in inner diameter as shown in FIG. 3B. It should be noted that with the radius $\underline{r}$ of the pin portion $\underline{c}$ being 25 mm and the radius $\underline{R}$ of the cutter $\underline{d}$ being 95 mm, a feed per cutting edge $\underline{f}$ of 0.5 mm had a surface machined with a roundness of 0.00092 and a feed per cutting edge $\underline{f}$ of 1 mm had a surface machined with a roundness of 0.00368.

In comparison, when a cutter of the embodiments in accordance with the present invention as described later had an inner peripheral radius of 40 mm to machine a like dimensioned pin portion, it has been found that a feed per cutting edge $\underline{f}$ of 0.5 mm had a surface machined with a roundness of 0.00047 and a feed per cutting edge $\underline{f}$ of 1 mm had a surface machined with a roundness of 0.00188, it being seen that a much improved roundness then results as compared with the use of a conventional cutter having an inner peripheral radius $\underline{r}$ of 95 mm.

It is accordingly an object of the present invention to overcome the disadvantage found in the prior art as noted above and thus to provide a method of machining a crankshaft workpiece with a crankshaft miller which method, using a cutter which is sufficiently reduced in the diameter of its inner peripheral surface, permits the workpiece to be machined at an enhanced machining precision under a reduced influence of edge run-out and geometrical errors, as well as to provide a cutter apparatus for carrying out the method.

SUMMARY OF THE INVENTION

In order to achieve the above mentioned object, there is provided in accordance with the present invention in a first aspect thereof a method of machining with a crankshaft miller to machine a workpiece into a crankshaft with pin and journal portions in which a crankshaft workpiece is held at at least one end thereof in a chuck and is machined for at least a part of pin and journal portions thereof with a cutting edge of a cutter body attached to a rotating cutter drum, which method comprises the steps of:

preparing a cutter body having the cutting edge formed along an inner peripheral surface thereof which is slightly larger in diameter than the diameter of a pin or journal portion of the workpiece to be machined;

attaching the cutter body to a cutter drum with an intermediary of an adapter means having an opening which is larger in diameter than both a diameter of the chuck and a maximum swing of the workpiece;

positioning the cutter drum at a standby site in an area where the chuck is located and carrying in the workpiece to have it secured and held in the chuck;

indexing and positioning the workpiece with respect to a phase position thereof; thereafter displacing the cutter drum in a longitudinal direction of the workpiece to position the cutter body at a predetermined machining site at which the pin or journal portion of the workpiece is located and thereafter rotating the cutter drum to machine the portion with the cutting edge of the cutter body;

repeating the preceding step to complete machining over the at least part of pin and journal portions of the workpiece at machining sites which are predetermined therefor, respectively; and thereafter re-positioning the cutter drum at such a standby site in the area where the chuck is located and then removing the machined workpiece from the chuck.

Machining a machinable portion of the workpiece by using a cutter body having a cutting edge formed along an inner peripheral surface with a diameter that is slightly larger than the outer diameter of the machinable portion of the workpiece and thus much smaller than a corresponding diameter of a conventional cutter body is found according to the method described above to largely reduce theoretical geometrical errors and hence to result in an enhanced roundness of a machined surface over the conventional method.

The present invention also provides, in a second aspect thereof, a workpiece machining cutter apparatus adapted for use in a crankshaft miller including a cutter drum that is rotatable about a crankshaft workpiece and also displaceable in a longitudinal direction thereof and a cutter body having a cutting edge formed along an inner peripheral surface thereof and adapted for attachment to the cutter drum whereby at least a part of pin and journal portions of the crankshaft workpiece as held at at least one end thereof in a chuck is milled while the cutter drum is in rotation, which cutter apparatus comprises:

an adapter adapted for detachable attachment to a cutter drum and having an opening that is larger in diameter than both an outer diameter of the chuck and a maximum swing of the workpiece; and a cutter body adapted for detachable attachment to the adapter at a center thereof and having an inner peripheral surface that is slightly larger in diameter than a diameter of the pin or journal portion of the workpiece to be machined, the inner peripheral surface having at least one cutting edge formed thereon.

A workpiece machining cutter apparatus constructed as described above if used to machine a machinable workpiece portion is found, by virtue of the use of a cutter body with a cutting edge formed along an inner peripheral surface having a diameter that is slightly larger than the outer diameter of the machinable workpiece portion and thus much smaller than the corresponding diameter of a conventional cutter body, to largely reduce theoretical geometrical errors and hence to result in an enhanced roundness of a so machined surface over the conventional cutter apparatus.

It is also found that when the cutter drum is removed to a standby position to permit the workpiece to be introduced into a machining zone or is displaced in the longitudinal direction of the workpiece while in a machining operation, the apparatus described effectively prevents the cutter body from interfering with the chuck or the workpiece by virtue of the fact that the adapter has an opening formed therein as described that is larger in diameter that both the outer diameter of the chuck and the maximum swing of the workpiece.

These advantages achieved by a workpiece machining cutter apparatus constructed in the second aspect of the present invention described are likewise gained by such an apparatus provided in a third aspect thereof, viz. a cutter apparatus adapted for use in a crankshaft miller including a cutter drum that is rotatable about a crankshaft workpiece and also displaceable in a longitudinal direction thereof and a cutter body having a cutting edge formed along an inner peripheral surface thereof and adapted for attachment to the cutter drum whereby at least a part of a pin and journal portions of the crankshaft workpiece as held at at least one end thereof in a chuck is milled while the cutter drum is in rotation, the cutter apparatus comprising:

an adapter adapted for detachable attachment to a cutter drum and having an opening that is larger in diameter than both an outer diameter of the chuck and a maximum swing of the workpiece; and a cutter body adapted for detachable attachment to the adapter means at a side thereof and having at least one cutting edge formed on an inner rim thereof, the cutter body being attachable to the adapter at such a site that a rotation of the adapter may cause the cutting edge to be moved along a circular path that is slightly larger in diameter than a diameter of a pin or journal portion of the workpiece to be machined.

In the practice of the present invention, it may be noted that the cutting edge can be arranged in a single row or in a pair of rows.

Also, the opening in the adapter means can be embodied as formed to be essentially circular in shape or essentially four cornered in shape.

The apparatus in the second or third aspect of the present invention is preferably constructed to further include a counter weight for removing, or making a correction for, a rotary unbalance as caused by the formation of the opening in the adapter means.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof In the accompanying drawings.

PREFERRED EMBODIMENTS OF

Hereinafter, suitable embodiments of the present invention with respect to a method of machining a crankshaft workpiece using a crankshaft miller, and a workpiece machining cutter apparatus, are set forth with reference to the accompanying drawings hereof.

Referring first to FIGS. 4 through 9, let us explain a crankshaft miller according to a first form of embodiment of the present invention.

Figure 4:
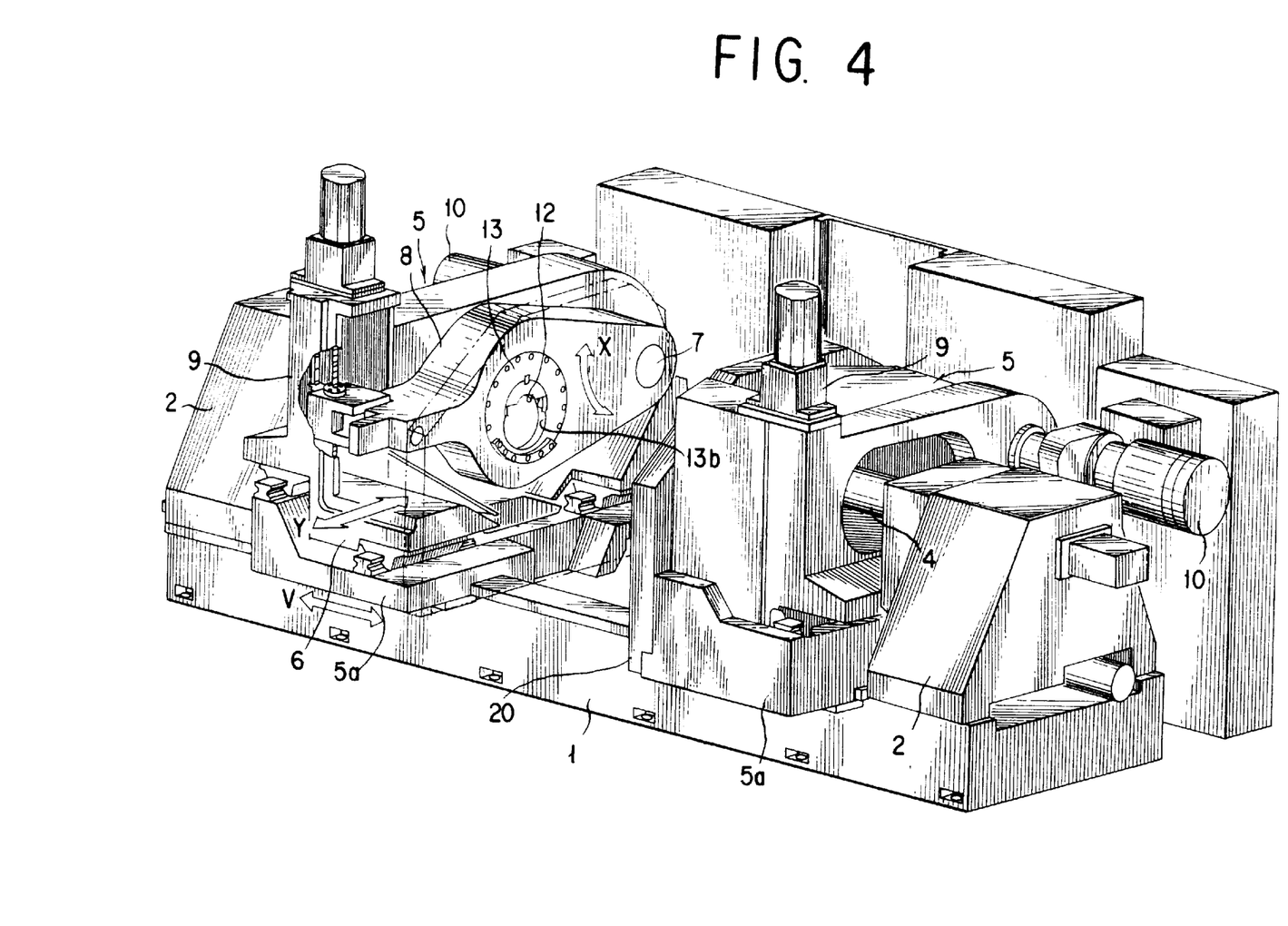
FIG. 4 is a perspective view showing a crankshaft miller that is constructed according a first embodiment of the present invention.
Figure 5:
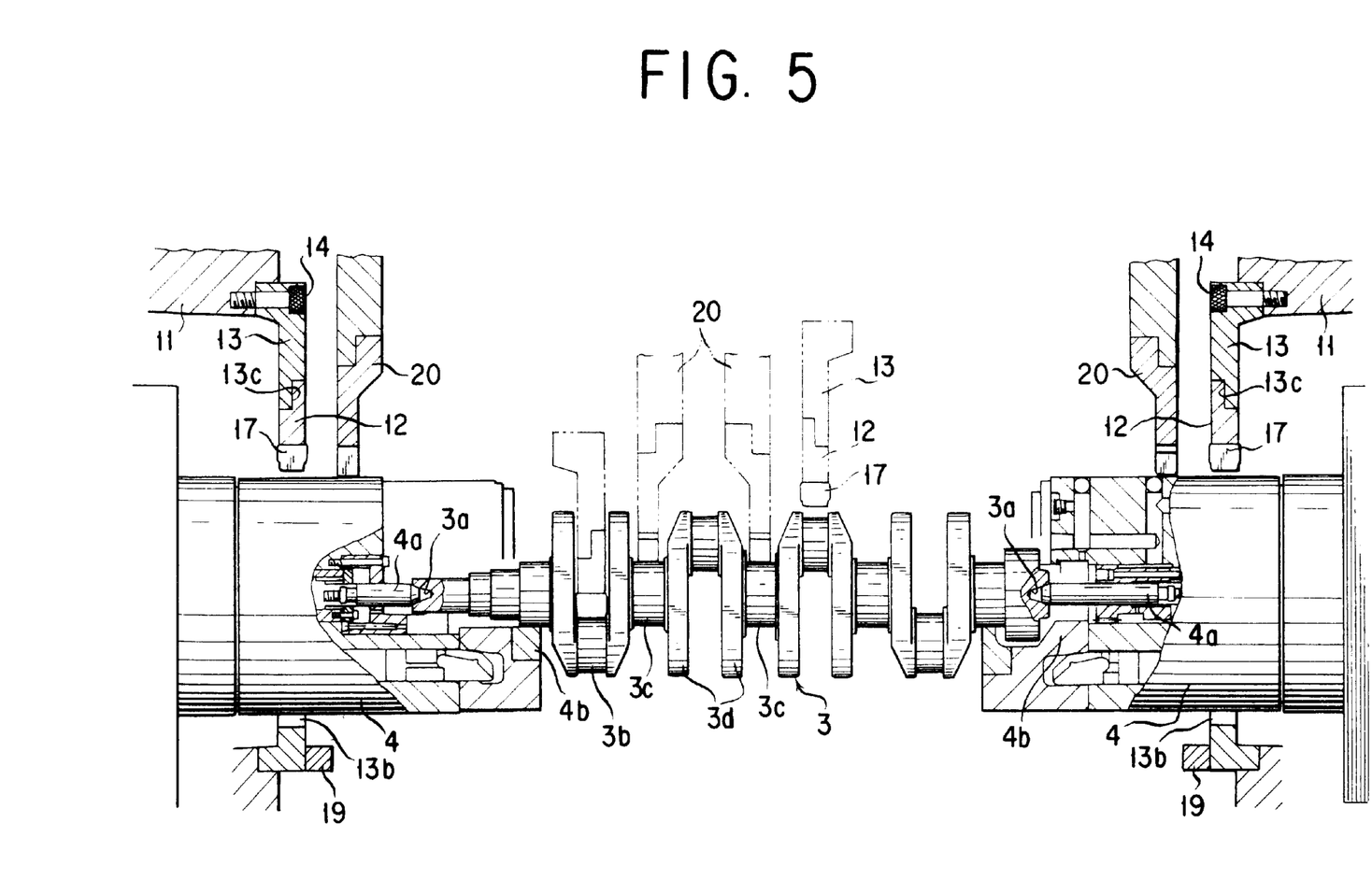
FIG. 5 is a front view of the crankshaft miller broken away in the regions of chucks.

The crankshaft is shown in FIG. 4 in a perspective view and in FIG. 5 in a front view in part broken away, and has a pair of work heads 2 and 2 mounted on a bed 1 at its opposed ends, respectively, each of which has a chuck 4, the chucks 4 being mounted to the opposing surfaces of the work heads 2, respectively, to hold and support a workpiece 3. Although the two chucks 4 and 4 are shown as provided to hold and support the workpiece 3, it should be noted that only a single chuck 4 mounted to one of the work heads 2 may be used to hold and support one end of the workpiece 3 while the other end of the workpiece 3 is held and supported by a center.

The chucks 4 as shown in FIG. 5 include centers 4a which are inserted into and fitted in center holes 3a drilled in the opposite ends of the workpiece 3 to hold and support it at these ends and each has a plurality of claws (or pawls) 4b for clamping each of these ends of the workpiece 3.

A pair of working heads 5 and 5 are also mounted on the bed 1, and are being displaceable in opposed directions, V-axis directions, in which they are moved towards and away from each other.

Each of the working heads 5 and 5 includes a saddle 5a slidable in a V-axis direction, a slide 6 mounted on the saddle 5a as being displaceable in a Y-axis direction orthogonal to the V-axis, and a swing arm 8 mounted on the slide 6 and pivotable about a shaft 7 at its one end relative to the slide 6.

The opposite end of the swing arm 8 is coupled to a rocking mechanism 9 mounted on the slide 6 so that the arm 8 may be swung thereby about the shaft 7 in an X-axis direction of or a vertical direction as shown. Each of the swing arms 8 and 8 is provided with a cutter drum 11 adapted to be rotationally driven by a cutter motor 10.

Figure 6A:
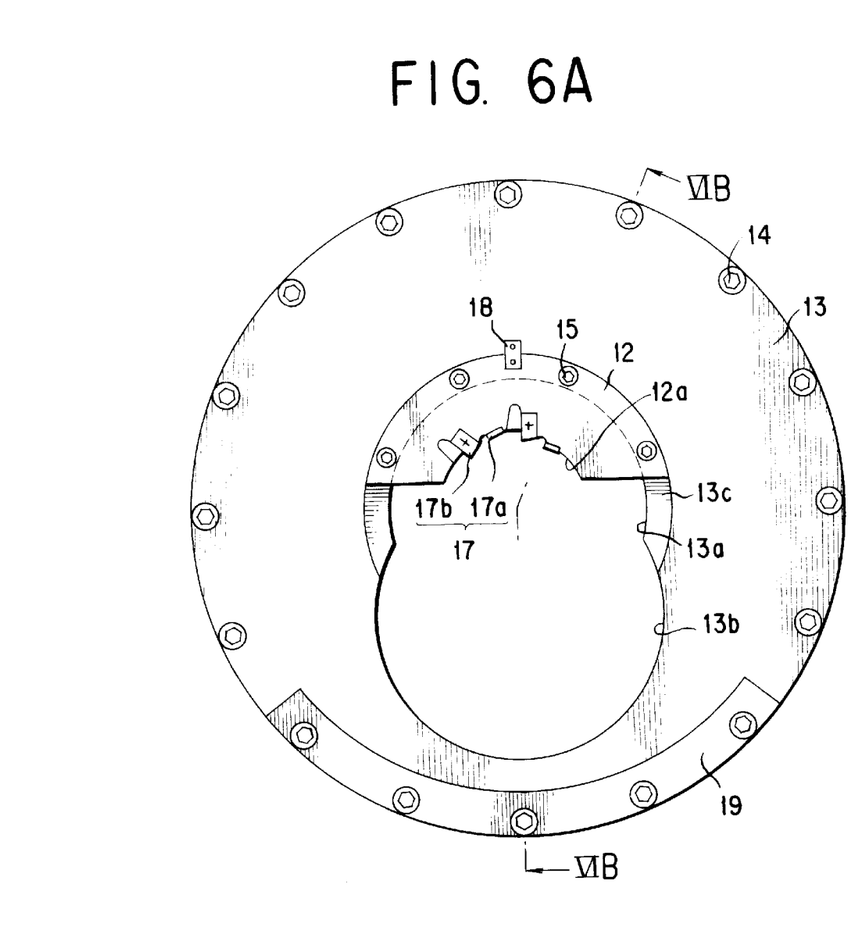
FIG. 6A is a front view showing a workpiece machining cutter apparatus that is constructed according to the first embodiment of the present invention.
Figure 6B:
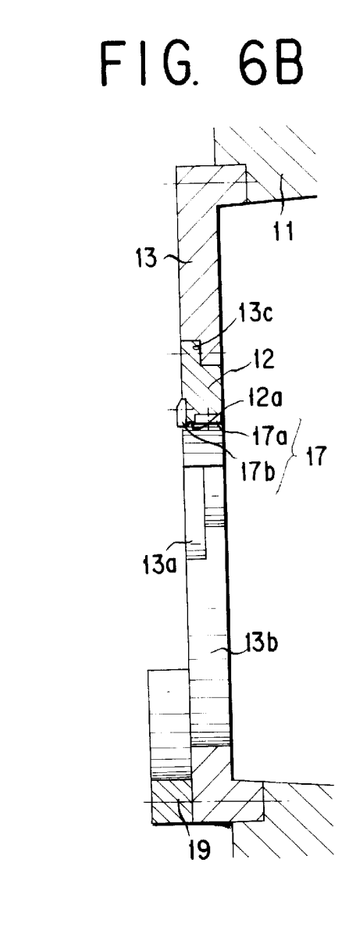
FIG. 6B is a cross sectional view of the workpiece machining apparatus shown in FIG. 6A taken along the line VIB—VIB.

Each of the opposing surfaces of the cutter drums 11 and 11 as shown in FIGS. 6A and 6B, has the outer peripheral surface of an adapter 13 detachably attached thereto by means of fastening bolts 14.

Each of the adapters 13 and 13 is disk-shaped and has a central opening 13a in a central region thereof which is of a shape approaching a semi-circle, and a circular opening 13b that is positioned below and eccentrically with, and is open contiguously to, the central opening 13a. The latter opening 13b is somewhat larger in diameter than the central opening 13a. Each of the adapters 13 and 13 is formed along and encircling the centrally located opening 13a with a concave step segment 13c to permit a cutter body 12 to be secured thereto by means of fastening bolts 15.

The lower or eccentric opening 13b is sized to be somewhat larger than the outer diameter of the chuck 4 so that when the workpiece 3 is to be carried into or removed from an area between the chucks 4 or to be positioned with respect to its phase, the cutter drums 11 may each be removed to a standby position on the side of the chuck 4 or where the chuck 4 is located, permitting the chuck 4 and the adapter 13 to avoid interfering with each other. If the workpiece 3 has a maximum swing (maximum diameter) greater than the outer diameter of the chuck 4, the opening 13b is dimensioned to be somewhat larger than the outer diameter of the chuck 4 so that the cutter body 12 may be freely moved in a longitudinal direction of the workpiece 3.

On the other hand, the cutter body 12 that is detachably attached to the adapter 13 in the centrally located opening 13a, as shown in FIG. 6A, is a semi-circular annular element of a form formed by dividing a ring at a somewhat less than half position and has its outer periphery that can be fitted in the concave step segment 13c and its inner peripheral surface 12a sized to be somewhat larger than the outer diameter of a pin or journal portion 3b, 3c of the workpiece 3 to be machined. A plurality of cutting edges 17 are removably attached onto and along this inner peripheral surface 12a.

The cutting edges 17 comprise outer peripheral cutting edge elements 17a in a pair of rows for machining the outer peripheral surface of a pin portion 3b or a journal portion 3c of the workpiece 3 and side surface cutting edge elements 17b in a pair of rows for machining R grooves 3e at the opposed ends of such a pin portion 3b or a journal portion 3c simultaneously with the machining of the outer peripheral surface.

In FIG. 6A, it should also be noted that numeral 18 designates a positioning key for use in positioning the cutter body 12 with respect to the adapter 13 when the former is attached to the latter; and numeral 19 represents a counter weight for use in removing or making a correction for a rotary unbalance as caused by the formation of the opening 13b at an eccentric position of the adapter 13.

In FIGS. 4 and 5, a work rest 20 for supporting the workpiece 3 is also shown, as mounted to a mounting surface of the saddle 5a.

Figure 7:
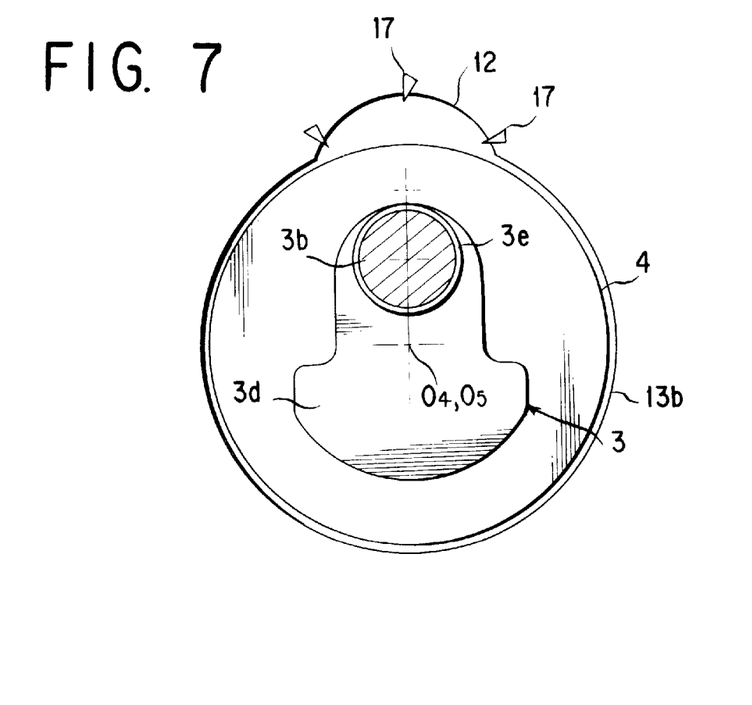
FIG. 7 is a diagrammatic view for describing a machining operation in which a workpiece is machined using the cutter apparatus according to the first embodiment.
Figure 8:
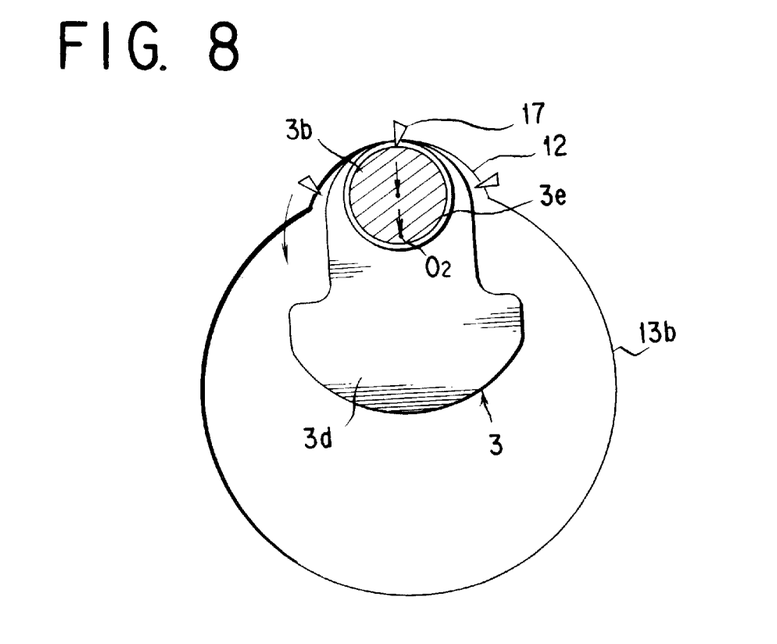
FIG. 8 is a diagrammatic view for further describing the machining operation in which the workpiece is machined using the cutter apparatus according to the first embodiment.

For an operation of machining a pin portion 3b of a workpiece 3 using a workpiece machining cutter apparatus constructed as described, an explanation will now be given with reference to FIGS. 7 through 9.

The workpiece 3 to be machined is introduced between the chucks 4 and 4 with a workpiece conveyer unit such as constituted by a loader. Then, after the workpiece 3 is positioned with respect to its phase angle while its opposed ends are supported by the centers 4a and 4a, respectively, these opposed ends are clamped with the claws (or pawls) 4b and thereby held in place. At this stage, each of the cutter drums 11 and 11 is removed to a standby position where the chuck 4 is located, and a center 04 of the opening 13b in the adapter 13 is in coincidence with a center 05 of the chucks 4 and 4 as shown in FIG. 7.

Then, the work heads 5 and 5 are moved in the opposing directions along the V-axis to position the cutter body 3 where a pin portion 3b is to be first machined. Then, after the center 02 of the cutter body 12 reaches a region of the center of the pin portion 3b, the cutter drum 11 is rotated by the cutter motor 10 to start to machine the pin portion 3b with the cutting edge 17 of the cutter body 12 attached to the cutter drum 11 via the adapter 13, as shown in FIG. 8.

Figure 9:
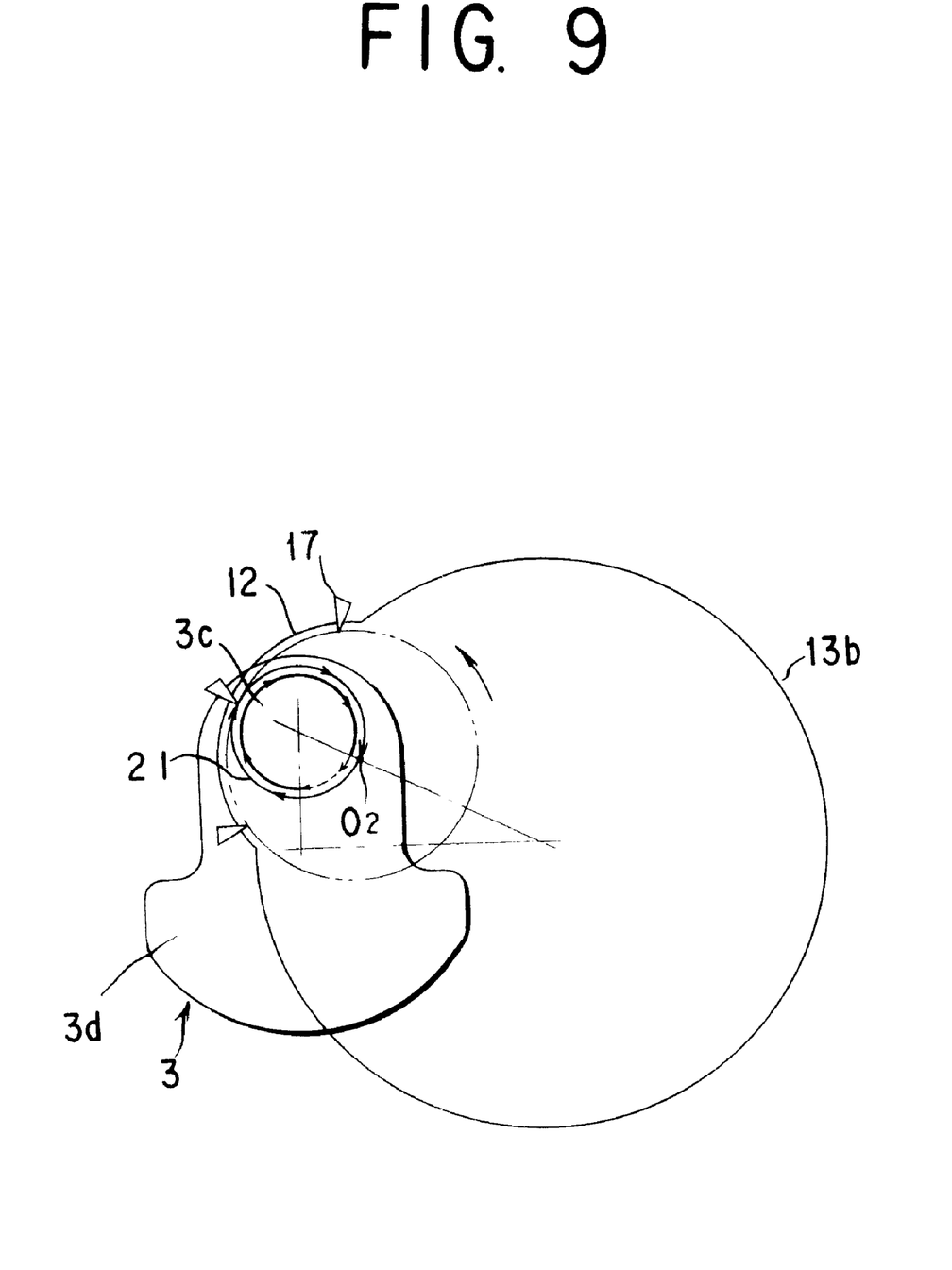
FIG. 9 is a diagrammatic view for further describing the machining operation according to which the workpiece is machined using the cutter apparatus in the first form of embodiment.

The slide 6 is moved in the direction of the Y-axis and the swing arm 8 is swung in the direction of the X-axis by the rocking mechanism 9 so that the center 02 of the cutter body 12 may move on a circular path 21 centering about the pin portion 3b as shown in FIG. 9. This will cause the pin portion 3b to be machined over its outer periphery with the outer peripheral surface cutting edge elements 17a and over the R grooves 3e and the side surfaces at its opposed ends with the side surface cutting edge elements 17b, simultaneously. Here, the machined pin portion 3b has an improved roundness by virtue of the fact that it has been machined by the cutting edge 17 formed along the inner peripheral surface 12a of the cutter body 12 of which the diameter (inner) is somewhat or slightly or a bit larger than the diameter of the outer peripheral surface of the pin portion. This is demonstrated, e. g., as follows.

To machine a pin portion 3b having a radius r of 25 mm, the use of a cutter body with its inner peripheral surface having a radius of 40 mm with a feed per cutting edge f of 1 mm yielded a roundness of a so machined pin portion of 0.00188, largely enhanced over a roundness of 0.00368 of such a pin portion machined using a conventional cutter body with its inner peripheral surface of a radius r of 95 mm.

Also, a reduced tendency to be polygonal as shown in FIG. 3B by using a cutter body of reduced inner diameter or radius is found to provide an improved machining accuracy of a machinable workpiece portion at sites including the outer peripheral surface, R grooves 3e and side surfaces of a pin portion 3b.

When machining of the first pin portion 3b has been finished, the cutter body 12 is returned to the position where the center 04 of the opening 13b in the adapter 13 coincides with the center 05 of the chucks 4. Then, after stopping the cutter body 12 at its original position as shown in FIG. 7, the drum 11 is moved to a region of a pin portion 3b to be machined next. By repeating the described steps of operation described for the number of pin portions 3b included, all the pin portions 3b can be machined.

When all the pin portions 3b have been machined, the cutter drum 11 is removed to its original standby position to permit the workpiece 3 for which machining has been completed to be carried out, and a workpiece 3 to be machined next is then carried is subjected to the steps of operation described for a required number of times.

While the operation has been described in conjunction with the machining of a pin portion 3b in a workpiece 3, it suffices to say that the operation likewise is applicable to the machining of the peripheral surface, R grooves at opposed ends and under cut sites on side surfaces of a journal portion 3c in the workpiece 3.

Also, while the first form of the embodiment described for a workpiece machining cutter apparatus in accordance with the present invention has been adopted for the adapter 13 comprised of openings 13a and 13b in a double potbellied form, it should be noted that the openings 13a and 13b need not be in such a form and may be in a form as shown in FIGS. 10 through 14, and the cutter body 12 may also be configured differently in accordance with particular forms of the opening 13b.

Figure 10A:
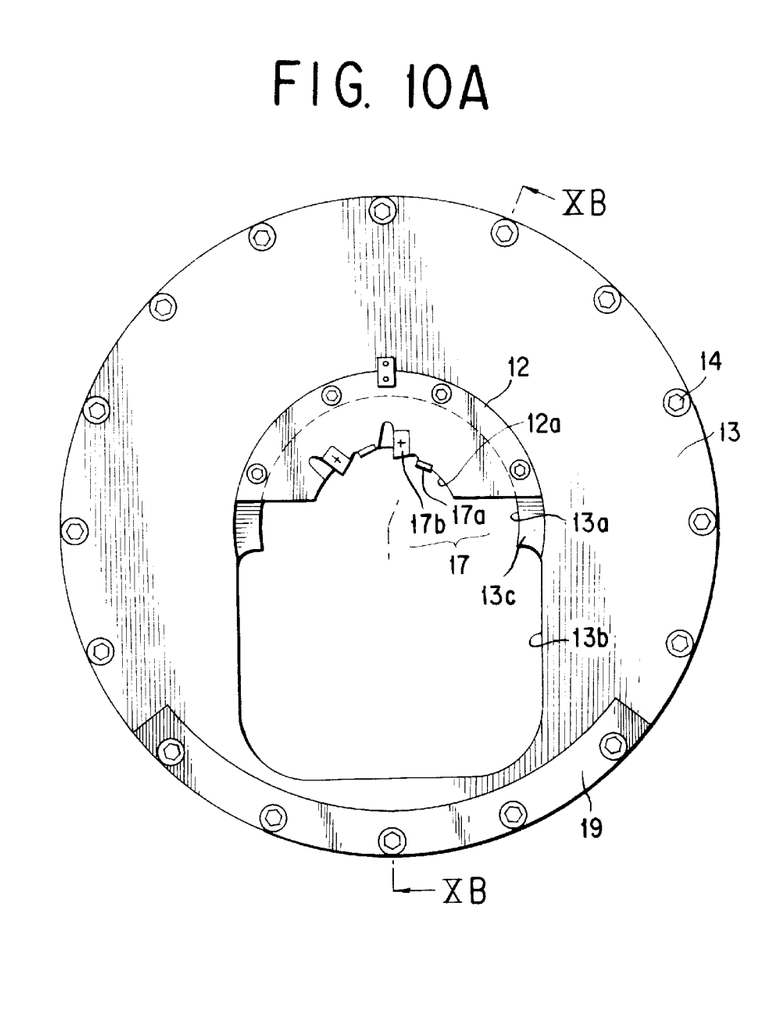
FIG. 10A is a front view showing a workpiece machining cutter apparatus that is constructed according to a second embodiment of the present invention.
Figure 10B:
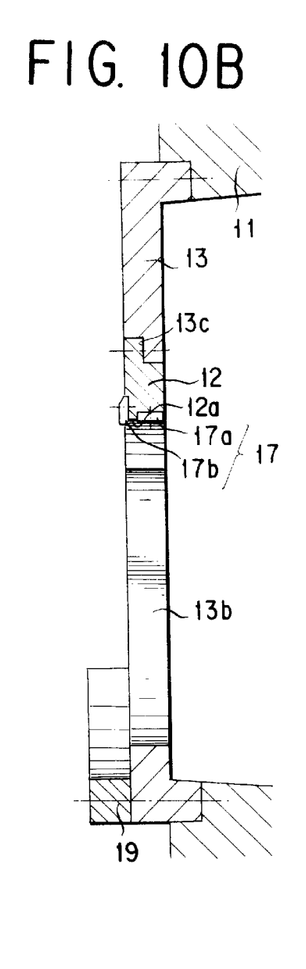
FIG. 10B is a cross sectional view of the workpiece machining apparatus shown in FIG. 10A, taken along the line XB—XB.

FIGS. 10A and 10B show a workpiece machining cutter apparatus constructed according to a second embodiment of the present invention, in which the cutter body 12 and the centrally formed opening 13a of the adapter 13 are basically the same in shape as those in the first embodiment but the second opening 13b is different and nearly rectangular in shape.

Figure 11A:
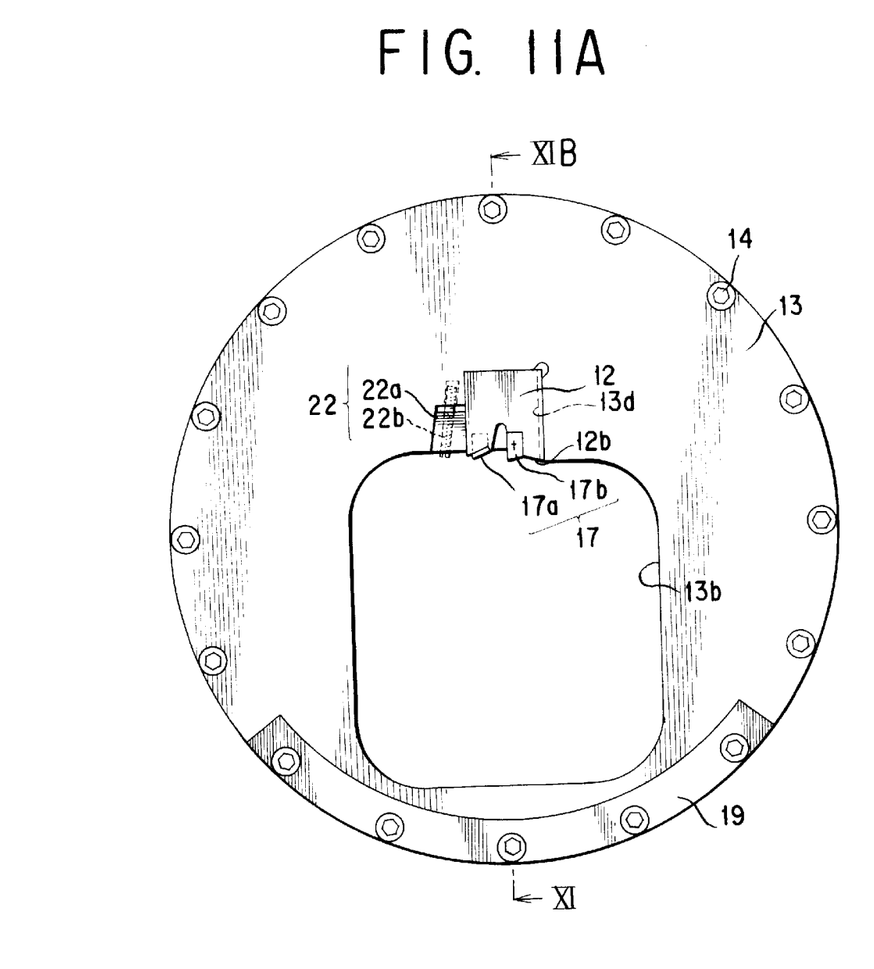
FIG. 11A is a front view showing a workpiece machining cutter apparatus that is constructed according to a third embodiment of the present invention.
Figure 11B:
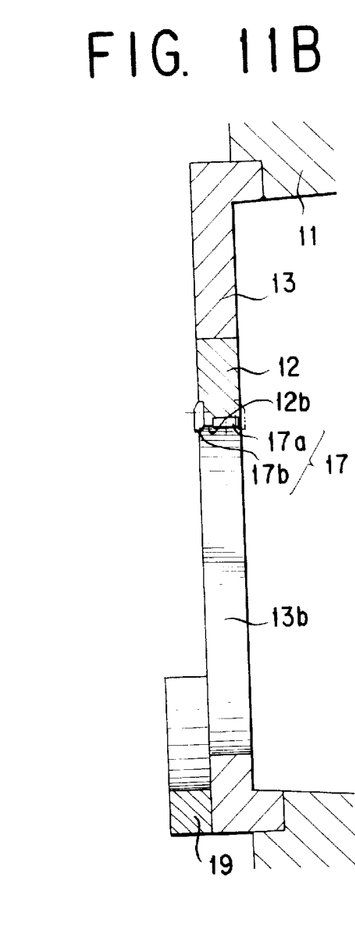
FIG. 11B is a cross sectional view of the workpiece machining apparatus shown in FIG. 11A, taken along the line XIB—XIB.

FIGS. 11A and 11B show a workpiece machining cutter apparatus constructed according to a third embodiment of the present invention, in which the adapter 13 has only a single, nearly rectangular opening 13b formed eccentrically therein and the cutter body 12 is fitted in and secured to a concave segment 13d arranged in a region of the center of an upper side of the opening 13b. The cutter body 12 has a plurality of outer peripheral surface cutting edges 17a and side surface cutting edges 17b formed each in a pair of rows on and along the inner rim 12b thereof. A wedge-shaped fixing member 22a and a fastening bolt 22b are used to have the cutter body 12 attached to the adapter 13 so as to be removable and adjustable in position. The cutter body 12 is attached in a position so that, when the adapter 13 is rotated, the peripheral surface cutting edge element 17a and the side surface cutting edge element 17b may be moved along a circular path that is to some extent larger in diameter than the outer diameter of a workpiece portion, e. g., a pin or journal portion 3b or 3c, to be machined in the workpiece 3.

Figure 12A:
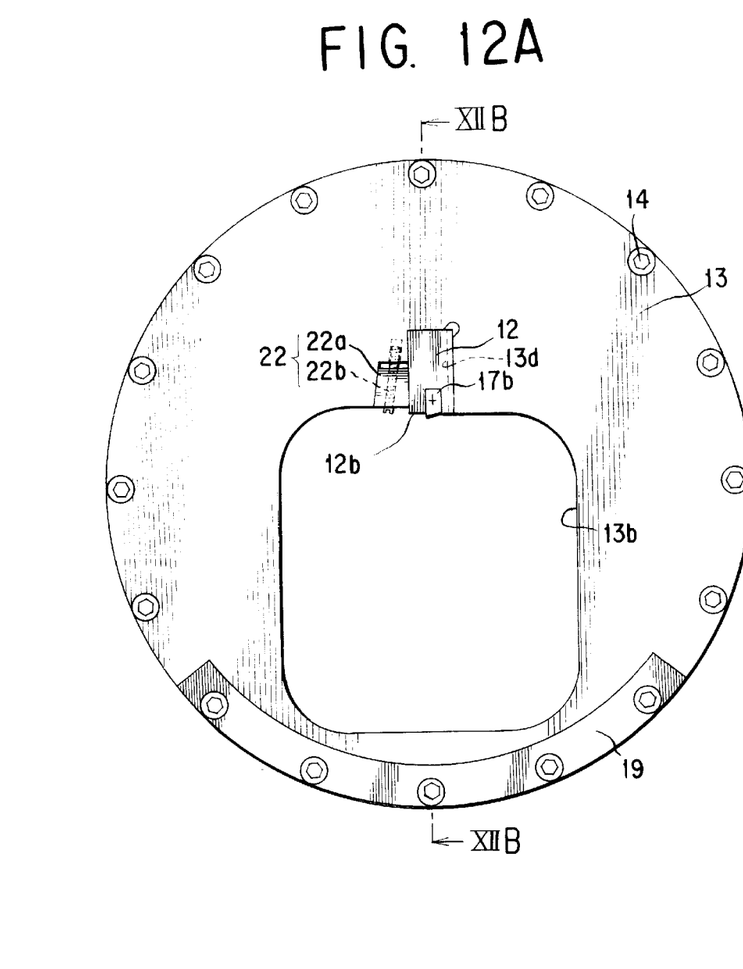
FIG. 12A is a front view showing a workpiece machining cutter apparatus that is constructed according to a fourth embodiment of the present invention.
Figure 12B:
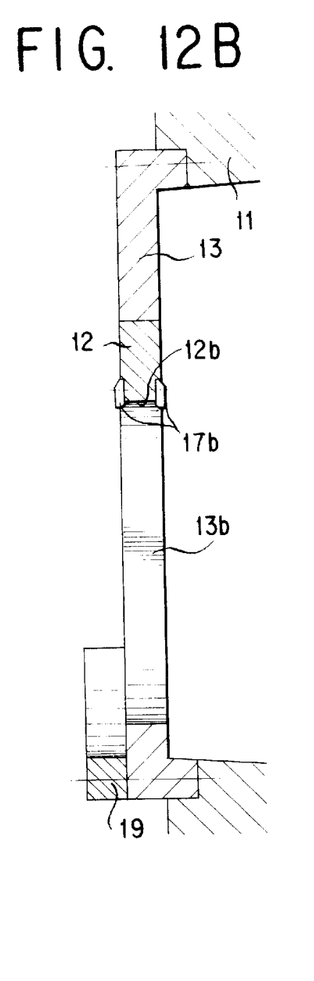
FIG. 12B is a cross sectional view of the workpiece machining apparatus shown in FIG. 12A, taken along the line XIIB—XIIB.

A fourth embodiment of the workpiece machining cutter apparatus as shown in FIGS. 12A and 12B is basically the same as the third embodiment except that the cutter body 12 has only the side surface cutting edge elements 17b arranged in a pair of rows on and along the inner rim 12b thereof.

Figure 13A:
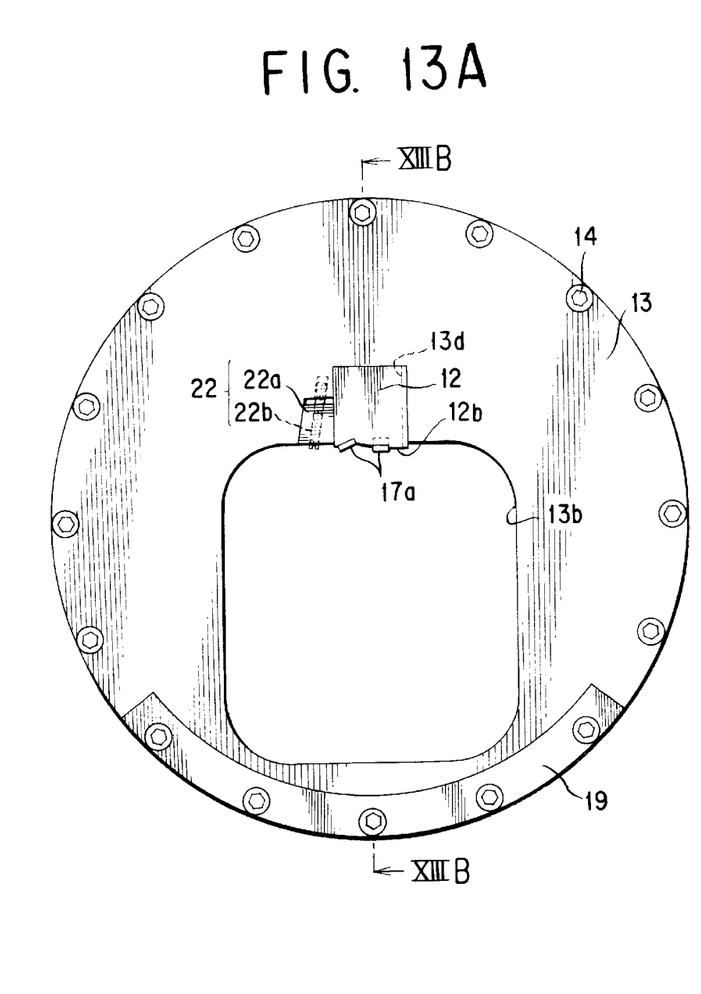
FIG. 13A is a front view showing a workpiece machining cutter apparatus that is constructed according to a fifth embodiment of the present invention.
Figure 13B:
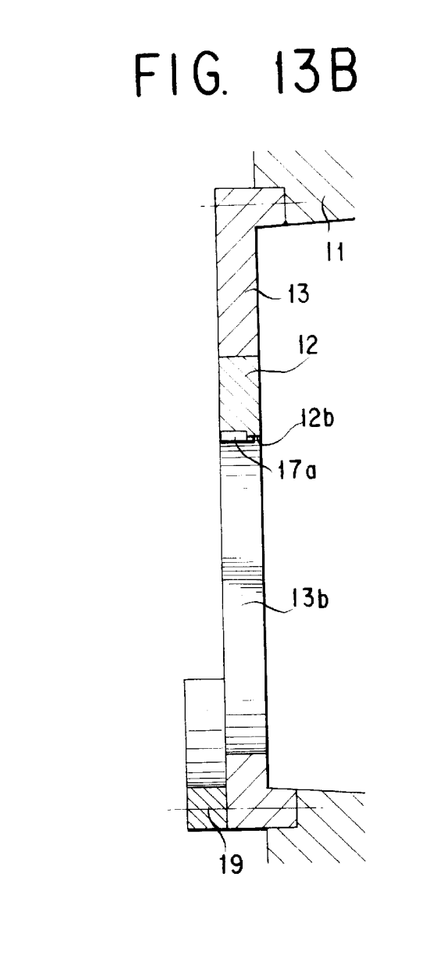
FIG. 13B is a cross sectional view of the workpiece machining apparatus shown in FIG. 13A, taken along the line XIIIB—XIIIB.

A fifth embodiment of the workpiece machining cutter apparatus as shown in FIGS. 13A and 13B is basically the same as the third embodiment except that the cutter body 12 has only the outer peripheral surface cutting edge elements 17a arranged in a pair of rows on and along the inner rim 12b thereof.

Figure 14A:
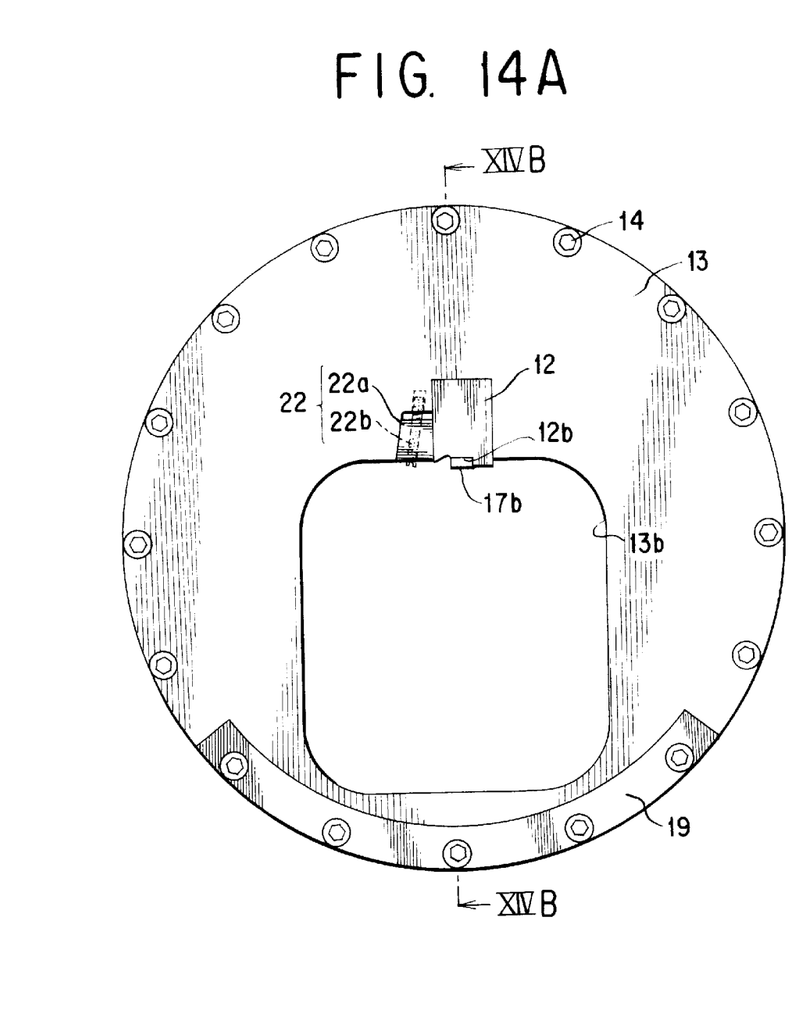
FIG. 14A is a front view showing a workpiece machining cutter apparatus that is constructed according to sixth embodiment of the present invention.
Figure 14B:
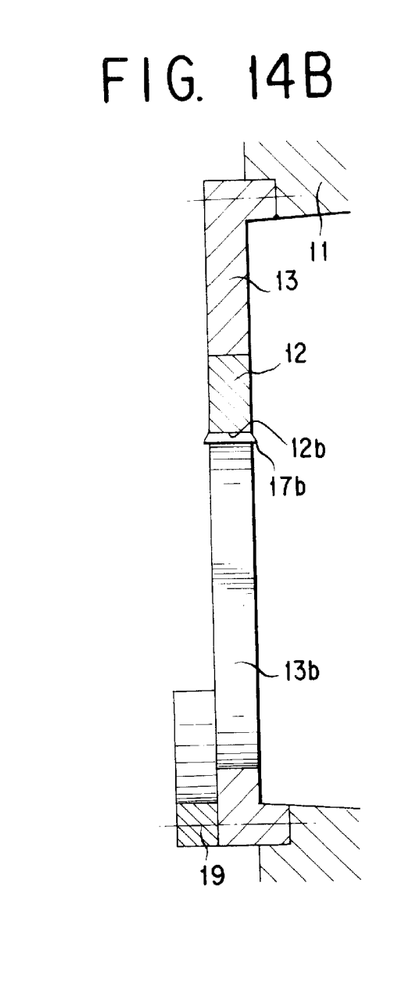
FIG. 14B is a cross sectional view of the workpiece machining apparatus shown in FIG. 14A, taken along the line XIVB—XIVB.

A sixth embodiment of the workpiece machining cutter apparatus as shown in FIGS. 14A and 14B is basically the same as the third embodiment described except that the cutter body 12 has only the outer peripheral surface cutting edge elements 17a as in the fifth embodiment but arranged in a single row on and along the inner rim 12b thereof.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A method of machining with a crankshaft miller to machine a workpiece into a crankshaft with pin and journal portions in which a crankshaft workpiece is held at at least one end thereof in a chuck and is machined for at least a part of pin and journal portions thereof with at least one cutting edge of a cutter body attached to a rotating cutter drum, the method comprising:

preparing said cutter body having the at least one cutting edge formed along an inner peripheral surface thereof which is larger in diameter than the diameter of a pin or journal portion of the workpiece to be machined but smaller in diameter than both the outer diameter of the chuck and the maximum swing of the workpiece;

attaching said cutter body so prepared to said cutter drum with an intermediary of an adapter having an opening which is larger in diameter than both the diameter of said chuck and the maximum swing of the workpiece;

positioning said cutter drum at a standby site in an area where said chuck is located and carrying in the workpiece to have it secured and held in said chuck;

indexing and positioning said workpiece with respect to a phase position thereof; thereafter displacing said cutter drum in a longitudinal direction of the workpiece to position said cutter body at a predetermined machining site at which said pin or journal portion of the workpiece is located and thereafter rotating said cutter drum to machine said pin or journal portion with said at least one cutting edge of the cutter body;

repeating said displacing and said rotating of said cutter drum to complete machining over said at least part of the pin and journal portions of the workpiece at machining sites which are predetermined therefor, respectively; and thereafter re-positioning said cutter drum at a standby site in the area where said chuck is located and then removing the machined workpiece from said chuck.

2. A cutter apparatus adapted for use in a crankshaft miller including a cutter drum that is rotatable about a crankshaft workpiece and also displaceable in a longitudinal direction thereof and a cutter body adapted for attachment to the cutter drum whereby at least a part of pin and journal portions of the crankshaft workpiece as held at at least one end thereof in a chuck is milled while the cutter drum is in rotation, the cutter apparatus comprising:

an adapter adapted for detachable attachment to said cutter drum and having an opening that is larger in diameter than both an outer diameter of said chuck and a maximum swing of the workpiece; and wherein the cutter body is adapted for detachable attachment to said adapter at a center thereof and having the inner peripheral surface that is larger in diameter than a diameter of a pin or journal portion of the workpiece to be machined but smaller in diameter than both the outer diameter of the chuck and the maximum swing of the workpiece, said inner peripheral surface having at least one cutting edge formed thereon.

3. A cutter apparatus adapted for use in a crankshaft miller including a cutter drum that is rotatable about a crankshaft workpiece and also displaceable in a longitudinal direction thereof and a cutter body adapted for attachment to the cutter drum whereby at least a part of pin and journal portions of the crankshaft workpiece as held at at least one end thereof in a chuck is milled while the cutter drum is in rotation, the cutter apparatus comprising:

an adapter adapted for detachable attachment to said cutter drum and having an opening that is larger in a diameter than both an outer diameter of said chuck and a maximum swing of the workpiece; and wherein the cutter body is adapted for detachable attachment to said adapter at a side thereof and having at least one cutting edge formed on an inner rim thereof, said cutter body being attachable to said adapter at such a site that a rotation of said adapter may cause said at least one cutting edge to be moved along a circular path that is slightly larger in diameter than a diameter of a pin or journal portion of the workpiece to be machined but smaller in diameter than the outer diameter of the chuck and the maximum swing of the workpiece.

4. A cutter apparatus as set forth in claim 2 in which said opening in said adapter is essentially circular in shape.

5. A cutter apparatus as set forth in claim 2 in which said opening in said adapter is essentially four cornered in shape.

6. A cutter apparatus as set forth in claim 2 in which said at least one cutting edge comprises a single cutting edge row.

7. A cutter apparatus as set forth in claim 2 in which said at least one cutting edge comprises a pair of cutting edge rows.

8. A cutter apparatus as set forth in claim 2 further comprising a counter weight for removing, or making a correction for, a rotary unbalance as caused by the formation of said opening in said adapter.

9. A cutter apparatus as set forth in claim 3 in which said opening in said adapter is essentially circular in shape.

10. A cutter apparatus as set forth in claim 3 in which said opening in said adapter is essentially four cornered in shape.

11. A cutter apparatus as set forth in claim 3 in which said at least one cutting edge comprises a single cutting edge row.

12. A cutter apparatus as set forth in claim 3 in which said at least one cutting edge comprises a pair of cutting edge rows.

13. A cutter apparatus as set forth in claim 3, further comprising a counter weight for removing, or making a correction for, a rotary unbalance as caused by the formation of said opening in said adapter.

* * * * *